United States Patent Office

3,422,018
Patented Jan. 14, 1969

---

3,422,018
METHOD OF MANUFACTURING FERROELECTRIC CERAMICS
Pierre Auguste Marcel Belloc, Paris, France, assignor to Societe Anonyme: Societe Alsacienne de Constructions Atomiques de Telecommunications et d'Electronique "Alcatel," Paris, France, a corporation of France
No Drawing. Filed July 28, 1965, Ser. No. 475,596
Claims priority, application France, July 31, 1964, 983,867
U.S. Cl. 252—62.9          12 Claims
Int. Cl. H01b 1/06

ABSTRACT OF THE DISCLOSURE

Ferroelectric ceramic lead-barium niobates are provided with increased density and uniformity and with improved dielectric properties and reproducibility by replacing substantial but small quantities of niobium atoms—up to 5%—with hafnium atoms.

---

This invention relates to improved ferroelectric ceramics based on lead-barium niobates. The invention likewise relates to a method of manufacturing such ceramics.

The invention has in particular as object ferroelectric ceramics capable of being used for the manufacture of electromechanical converter elements having the most diverse shapes, for example discs, plates, cylinders, spherical domes, and so on.

The interesting properties of ceramics based on solid solutions of lead niobate and barium niobate have been known for some years, particularly those of solid solutions the molar content of barium niobate of which is between 30 and 50%. Such compositions may in fact have a planar coupling coefficient as high as 0.35; the Curie point is close to 300° C., whereas in barium titanate based ceramics the Curie point scarcely exceeds 150° C.

In order to manufacture such ceramics, the starting materials are generally lead oxide PbO, niobium pentoxide $Nb_2O_5$, and barium carbonate $BaCO_3$; these various products are mixed in suitable proportions in the presence of water and a binder. After drying and pulverisation they are then shaped, the resulting rough product is fired so as to obtain the ceramic product, machining is effected, electrodes are applied, and the part is activated by polarisation.

The known methods of manufacture of such ceramics nevertheless have various disadvantages and supply products having defective electromechanical properties or else batches of parts which have great dispersion of electromechanical properties in relation to one another.

More precisely, the utilisation of such processes has made it possible to discover the following major disadvantages:

(1) The density of the parts obtained is low and very far from the theoretical density. This results in defective electromechanical activity due to the poor characteristics thus obtained.

(2) Electrical resistivity is also low and decreases very rapidly when the temperature rises.

Because of these two major disadvantages it is impossible to effect satisfactory polarisation of the parts. Ceramics are then obtained which have poor electromechanical characteristics and batches of parts exhibiting considerable dispersion of such electromechanical characteristics (dielectric constant, frequency constant, coupling coefficients, etc.) in relation to one another. Such dispersions may even be observed between parts from the same firing batch.

The invention has as object ferroelectric ceramic compositions having good electromechanical properties and capable of being manufactured in a reproducible manner; in other words, the dispersion of the electromechanical characteristics between the parts of the same batch or of different batches is low. The invention also relates to the process of manufacturing such compositions.

The invention shows that the substitution of hafnium atoms for niobium atoms, preferably in proportions ranging from 0 to 5%, in solid solutions of lead niobate and barium niobate made it possible to obtain ceramics having the abovementioned properties.

The invention also shows that the addition of such quantities of hafnium made it possible to obtain parts of suitable density and the resistivity of which had a fairly high value even if temperatures are higher than ambient temperature.

The hafnium used in such concentrations also provides the advantage of permitting polarisation at higher temperature and electric field values; better electromechanical properties are thus imparted to the finished part.

In addition, experience shows that the best results are obtained when the starting products used are the lead oxides $Pb_3O_4$ and $PbO_2$ instead of the oxide PbO, which was previously used in the known art. The same result is moreover obtained when a mixture of $Pb_3O_4+PbO_2$ is used in substantially equal respective proportions.

As well as the addition of hafnium, the utilisation of the abovementioned lead oxides supplies finished parts the planar coupling coefficient of which may attain 0.40, whereas this value scarcely exceeds 0.35 when the oxide PbO is used.

According to the invention, the ceramic products used is essentially constituted by a basic solid solution composed of lead niobate and barium niobate, the proportion of barium niobate being between 30 and 50% for complementary concentrations of lead niobate.

This basic solid solution is modified according to the preferred embodiment of the invention, that is to say part of the niobium atoms, ranging from 0 to 5%, is replaced by hafnium atoms.

In order to prepare the ceramics of the invention, it is recommended to use niobium pentoxide, a lead oxide selected from the oxides $Pb_3O_4$ or $PbO_2$ or a mixture thereof, barium carbonate, and hafnium oxide ($HfO_2$).

One process of manufacturing the ceramics of the invention is as follows:

The starting products are mixed in suitable proportions to obtain the desired percentages in the finished ceramic material. Mixing may be effected in aqueous medium, particularly in a ball mill over a period of several hours. The resulting paste is filtered, dried, and then ground for example in a ball grinder until a very fine powder is obtained. Rough parts are then shaped either by pressing the powder, wetted to a greater or lesser extent with water and a binder, or by extrusion or by moulding in the form of slips.

The rough products are then fired in an electric furnace at a temperature between 1100° and 1350° C., which is maintained for from 30 minutes to 2 hours; the speed of heating may vary from 50 to 200° C. per hour depending on the dimensions of the parts.

The resulting parts are machined with diamond tipped tools to the desired dimensions and then silvered.

The last stage of the process consists in imparting piezoelectric properties to these parts in a known manner, that is to say applying an electric field which may range from 2000 to 4000 v. per mm. at a temperature of the order of 250 to 350° C. The ceramic material is then cooled to ambient temperature while the electric field continues to be applied.

Measurements may then be made 24 hours after polarisation.

The invention is illustrated, without being in any way limited, by the following example:

EXAMPLE

|  | G. |
|---|---|
| Niobium pentoxide | 533 |
| $PbO_2$-$Pb_3O_4$ mixture in equal proportions | 280 |
| Barium carbonate | 158 |
| Hafnium dioxide | 17 | are mixed in an aqueous medium.

After drying and grinding the mixture, a disc of a diameter equal to 40 mm. and a thickness of 3 mm. was made by pressing and fired at 1250° C. for 1 hour. The product was machined to obtain a disc of a diameter equal to 33 mm. and a thickness of 2 mm., and piezoelectric properties were imparted to the part by polarising at 3000 v. per mm. at 300° C. and allowing the parts to cool to ambient temperature while continuously applying the electric field. A planar coupling coefficient of 0.39 was thus obtained.

What is claimed is:

1. A ferroelectric ceramic material consisting essentially of a solid solution of about 70 to 50 molar percent lead niobate and about 30 to 50 molar percent barium niobate wherein a substantial part of the niobium atoms up to 5% thereof has been replaced by hafnium, said part being sufficient to increase the density and uniformity and improve the reproducibility and dielectric properties of said ceramic.

2. The material according to claim 1 wherein the solid solution contains about 36 percent by weight of barium niobate with about 64 percent of lead niobate.

3. The material according to claim 1 wherein a quantity of about 2 percent of the niobium atoms in the solid solution is replaced by hafnium atoms.

4. A ferroelectric ceramic material constituted by a solid solution of lead niobate and barium niobate wherein a quantity of about 2 percent of the niobium atoms in the solid solution is replaced by hafnium atoms and wherein the solid solution contains about 36 percent by weight of barium niobate with about 64 percent of lead niobate.

5. A method of manufacturing a ferroelectric ceramic consisting essentially of a solid solution of about 70 to 50 molar percent lead niobate and about 30 to 50 molar percent of barium niobate wherein a substantial part up to 5% of the niobium atoms are replaced by hafnium, said method consisting in intimately mixing the constituents, drying and grinding the mixture so obtained, shaping an article therefrom, firing, said article at a temperature between 1100 and 1350° C., machining and silvering the resultant hard article, imparting ferroelectric properties to said article by the application thereto of a continuous electric field of from 2000 to 4000 volts per mm. at a temperature of between 250° and 350° C. and allowing said article to cool to ambient temperature while continuously applying said electric field, said part being sufficient to increase the density and uniformity and improve the reproducibility and dielectric properties of said ceramic.

6. The method according to claim 5 in which the constituents are mixed in an aqueous medium.

7. The method according to claim 5 wherein the lead is introduced in the form of the oxide $Pb_3O_4$.

8. The method according to claim 5 wherein the lead is introduced in the form of the oxide $PbO_2$.

9. The method according to claim 5 wherein the lead is introduced in the form of a mixture of the oxides $Pb_3O_4$ and $PbO_2$.

10. The method according to claim 9 wherein the mixture of the oxides comprises $Pb_3O_4$ and $PbO_2$ in equal proportions.

11. The method according to claim 5 wherein the hafnium is introduced in the form of the oxide $HFO_2$.

12. A method according to claim 5, wherein the niobium is introduced in the form of the pentoxide $Nb_2O_5$.

References Cited

UNITED STATES PATENTS

| 2,849,404 | 8/1958 | Jaffe et al. | 252—62.9 |
| 2,892,955 | 6/1959 | Gulton | 252—62.9 |
| 3,222,283 | 12/1965 | Illyn et al. | 252—62.9 |

TOBIAS E. LEVOW, *Primary Examiner.*

R. D. EDMONDS, *Assistant Examiner.*

U.S. Cl. X.R.

106—39